US011955326B2

(12) United States Patent
Loux

(10) Patent No.: US 11,955,326 B2
(45) Date of Patent: Apr. 9, 2024

(54) MULTI-DEVICE REMOVAL AND INSTALLATION TOOL

(71) Applicant: AGILENT TECHNOLOGIES, INC., Santa Clara, CA (US)

(72) Inventor: Alan D. Loux, Newark, DE (US)

(73) Assignee: AGILENT TECHNOLOGIES, INC., Santa Clara, CA (US)

( * ) Notice: Subject to any disclaimer, the term of this patent is extended or adjusted under 35 U.S.C. 154(b) by 211 days.

(21) Appl. No.: 17/203,521

(22) Filed: Mar. 16, 2021

(65) Prior Publication Data

US 2022/0301842 A1 Sep. 22, 2022

(51) Int. Cl.

| | |
|---|---|
| ***H01J 49/04*** | (2006.01) |
| ***B25B 27/14*** | (2006.01) |
| ***H01J 49/06*** | (2006.01) |
| ***H01J 49/10*** | (2006.01) |

(52) U.S. Cl.

CPC ............ *H01J 49/067* (2013.01); *B25B 27/14* (2013.01); *H01J 49/04* (2013.01); *H01J 49/105* (2013.01)

(58) Field of Classification Search

CPC ........ H01J 49/04; H01J 49/067; H01J 49/105; H01J 49/02; B25B 27/14; B25B 11/00; B25B 27/143

See application file for complete search history.

(56) References Cited

U.S. PATENT DOCUMENTS

| | | | | |
|---|---|---|---|---|
| 3,445,913 | A * | 5/1969 | Piquerez | G04D 3/067 29/896.33 |
| 5,255,435 | A * | 10/1993 | Shultz | B25B 27/023 29/259 |
| 2010/0024183 | A1 | 2/2010 | Cuprys | |
| 2013/0263444 | A1 | 10/2013 | Lo et al. | |
| 2017/0314711 | A1* | 11/2017 | Helstern | F16L 19/00 |
| 2019/0350614 | A1* | 11/2019 | Matani | A61B 17/320016 |

(Continued)

FOREIGN PATENT DOCUMENTS

| | | | |
|---|---|---|---|
| DE | 19512793 | A1 | 10/1995 |
| DE | 10012002 | C2 | 2/2002 |
| DE | 69628316 | T2 | 4/2004 |

(Continued)

OTHER PUBLICATIONS

Machine translation of JP3182750 (Year: 2023).*

(Continued)

*Primary Examiner* — Michael J Logie
(74) *Attorney, Agent, or Firm* — Mannava & Kang, P.C.

(57) ABSTRACT

In some examples, a multi-device removal and installation tool may include a device removal tool including catch members engageable with an engagement face of a device to attach, upon engagement of the catch members with the engagement face, the device removal tool to the device. The catch members may engage the engagement face with a removal force that is sufficient to remove, upon engagement of the catch members with the engagement face, the device from an instrument. The multi-device removal and installation tool may further include a torque limit tool including a retainer having at least one protrusion, and a drive member having an inside surface and an outside surface. The torque limit tool may further include at least one detent positioned on the inside surface.

15 Claims, 9 Drawing Sheets

(56) References Cited

U.S. PATENT DOCUMENTS

| | | | | |
|---|---|---|---|---|
| 2021/0142995 | A1* | 5/2021 | Asahi | G01N 27/62 |

FOREIGN PATENT DOCUMENTS

| | | | | |
|---|---|---|---|---|
| DE | 102008034811 | B4 | | 8/2010 |
| DE | 102007025290 | B4 | | 3/2017 |
| EP | 2679343 | A1 | | 1/2014 |
| EP | 3677799 | A1 | | 7/2020 |
| EP | 3552275 | B1 | | 6/2021 |
| JP | 3182750 | U | * | 4/2013 |
| JP | 3189300 | U | * | 3/2014 |

OTHER PUBLICATIONS

Glass Expansion, "ConeGuard Thread Protector", Downloaded from the Internet on Jan. 12, 2023, 4 pages.

German Patent Office, "Search Report on Application DE102022106157.4", dated Jan. 12, 2023, 5 pages.

* cited by examiner

SECTION 6-6

SECTION 5-5

SECTION 10-10

MULTI-DEVICE REMOVAL AND INSTALLATION TOOL

BACKGROUND

In various product design, development, manufacturing, and utilization environments, different operations may need to be performed on a device. For example, a device may need to be grasped, moved to a maintenance or another location for inspection, cleaning, fixing, and/or utilization, and may further need to be moved back to an original or another location. According to another example, an instrument may include various devices that may need to be grasped and removed, inspected for maintenance activities that may include cleaning and/or fixing, re-installed on the instrument, and/or moved to another location as needed.

Typically, a user may grasp a device, inspect the device for maintenance activities that may include cleaning and/or fixing, re-install the device on the instrument, and/or move the device to another location. In some cases, the device may include delicate areas that may be susceptible to damage. In this regard, it can be technically challenging to protect the delicate areas of the device during activities that may include grasping, removing, cleaning, fixing, re-installation, and/or utilization, and other types of activities.

BRIEF DESCRIPTION OF DRAWINGS

Features of the present disclosure are illustrated by way of example and not limited in the following figure(s), in which like numerals indicate like elements, in which.

DETAILED DESCRIPTION

Figure 1:
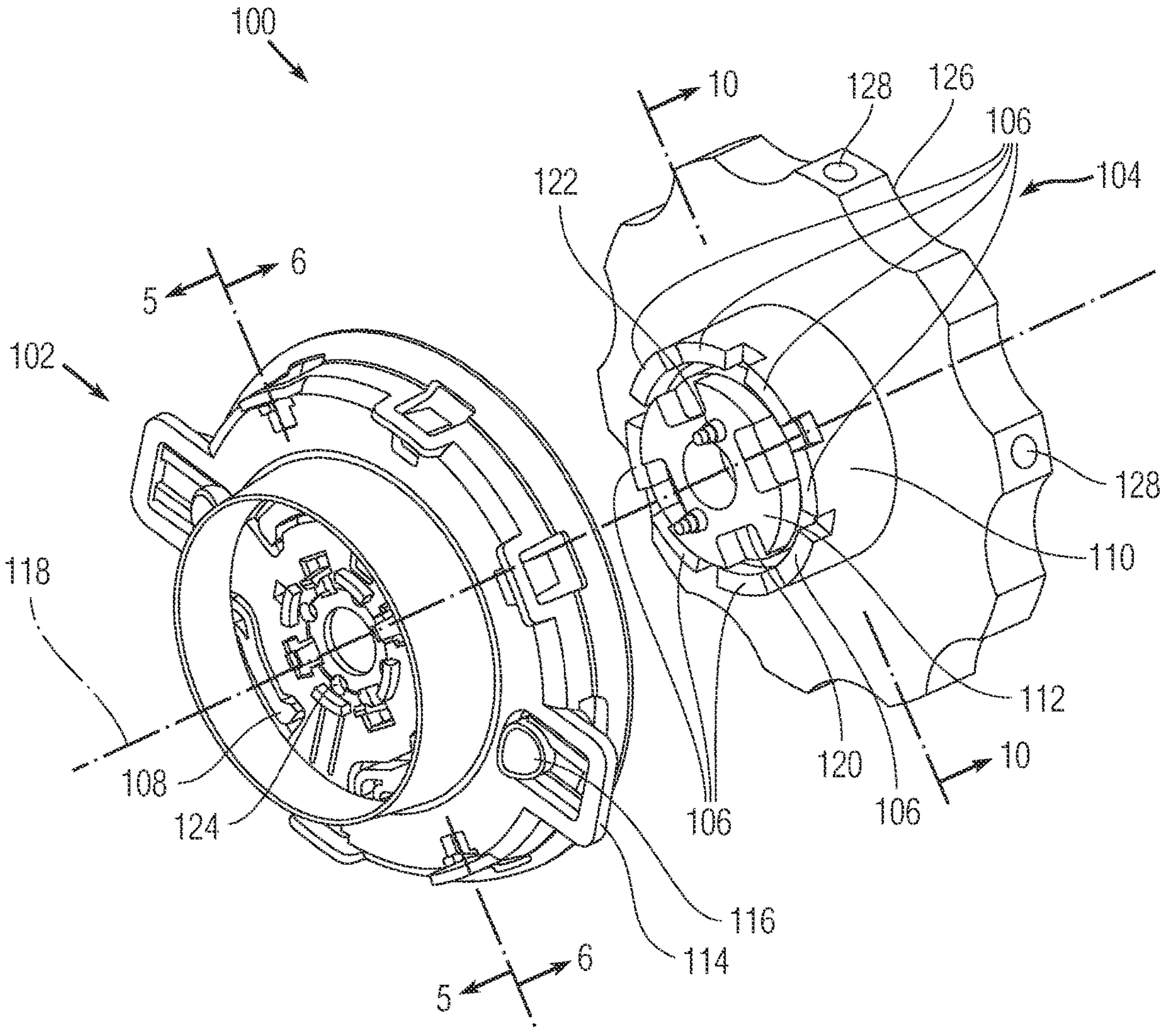
FIG. 1 illustrates an isometric view of a device removal tool and a torque limit tool of a multi-device removal and installation tool, in accordance with an example of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, and the term "including" means including but not limited to. The term "based on" means based at least in part on.

As disclosed herein, a device may need to be grasped, moved to a maintenance or another location for inspection, cleaning, fixing, and/or utilization, and/or moved back to an original or another location as needed. For example, an instrument may include various devices that may need to be grasped and removed, inspected for maintenance activities that may include cleaning and/or fixing, re-installed on the instrument, or moved to another location as needed. In one example, for an instrument that includes an inductively coupled plasma mass spectrometry (ICP-MS) instrument, a device, such as a skimmer cone and/or a sampler cone, may need to be grasped and removed from the instrument, inspected for maintenance activities that may include cleaning and/or fixing, and re-installed on the instrument. The ICP-MS instrument may utilize an inductively coupled plasma to ionize a sample, with the skimmer cone and the sampler cone being respectively disposed between plasma and detector sides of the instrument. The skimmer cone and the sampler cone may also be referred to as interface cones. A user of the ICP-MS instrument may grasp the skimmer cone and/or sampler cone, inspect the cones for maintenance activities that may include cleaning and/or fixing, and re-install the cones on the ICP-MS instrument. The skimmer cone and/or sampler cone may include delicate areas such as cone threads, a cone tip, etc., which may be susceptible to damage. In this regard, it can be technically challenging to grasp the skimmer cone and/or sampler cone, and protect the delicate areas of the cones during removal, maintenance activities that may include cleaning and/or fixing, and re-installation activities.

In order to address at least the aforementioned technical challenges, a multi-device removal and installation tool is disclosed herein and may include a device removal tool to remove, retain, and re-install a device, which may include the skimmer cone and/or the sampler cone, of the instrument that may include the ICP-MS instrument. The multi-device removal and installation tool may further include a torque limit tool to limit a torque that may be applied to the device during installation of the device on the instrument. The device removal tool may be utilized in a stand-alone manner to remove, retain, and re-install the device that may include the sampler cone. For the device that may include the skimmer cone, the device removal tool may be utilized in conjunction with the torque limit tool to remove, retain, and re-install the skimmer cone on the instrument. With respect to retention of the device, the device removal tool may be configured as disclosed herein to retain the device during transit of the device, for example, from the instrument to a maintenance location. At the maintenance location, various operations may be performed on the device, such as inspection, cleaning, etc. The device, which may be retained in the device removal tool during these operations, may thus be mechanically protected as the delicate areas of the device remain free from contact by the device removal tool and/or the torque limit tool. After completion of these operations, the device may continue to be retained in the device removal tool until re-installation on the instrument, or otherwise, the device, while still in the device removal tool, may be stored as needed.

According to examples disclosed herein, the multi-device removal and installation tool may include the device removal tool including a plurality of catch members engageable with an engagement face of the device to attach, upon engagement of the plurality of catch members with the engagement face, the device removal tool to the device. The plurality of catch members may engage the engagement face with a removal force that is sufficient to remove, upon engagement of the plurality of catch members with the engagement face, the device from an instrument. For example, as disclosed herein, the removal force may be greater than or equal to 20 G normal a central axis of the device removal tool for the device that may include the skimmer cone and/or the sampler cone of the ICP-MS instrument.

With respect to the catch members, according to examples disclosed herein, the plurality of catch members may include three or more catch members. For example, in a particular configuration of the device removal tool disclosed herein, the plurality of catch members may include four catch members engageable with an engagement face of the device that includes the skimmer cone of the instrument that includes the ICP-MS instrument. According to another example disclosed herein, the plurality of catch members may include six catch members engageable with an engagement face of the device that includes the sampler cone of the instrument that includes the ICP-MS instrument. However, those skilled in the art would appreciate in view of this disclosure that the number of catch members may be increased or decreased as needed to attach the device removal tool to the device, without departing from the scope of the disclosure. Further, those skilled in the art would appreciate in view of this disclosure that the device may include any type of device that may be grasped and moved by the multi-device removal and installation tool as disclosed herein.

With respect to the engagement face, according to examples disclosed herein, for the device that includes the sampler cone, the engagement face may include a channel that engages with the plurality of catch members. For example, the engagement face may include a V-shaped, a U-shaped, or another type of channel. However, those skilled in the art would appreciate in view of this disclosure that the shape of the channel may be formed in any configuration to engage a catch member, without departing from the scope of the disclosure.

According to examples disclosed herein, the torque limit tool may include at least one protrusion, and may be removably engageable with the device removal tool. The torque limit tool may apply, by the at least one protrusion, in a first rotation direction of the torque limit tool and the device removal tool, a tightening torque to the device. Further, the torque limit tool may apply, by the at least one protrusion, in a second rotation direction of the torque limit tool and the device removal tool, a loosening torque to the device. The second rotation direction may be generally opposite to the first rotation direction.

According to examples disclosed herein, the at least one protrusion may be engageable with at least one torque beam of the device removal tool to deflect, upon application of the tightening torque that exceeds a torque threshold, the at least one torque beam to limit the tightening torque that is applied to the device. In this manner, as disclosed herein, the torque beam may prevent overtightening of the device when the device is rotatably attached back onto the instrument.

According to examples disclosed herein, the torque limit tool may include a retainer having at least one protrusion. The retainer may be removably engageable with the device removal tool that engages the engagement face of the device. The torque limit tool may include a drive member having an inside surface and an outside surface. Further, the torque limit tool may include at least one detent positioned on the inside surface. The torque limit tool may include at least one engagement portion to engage a leveraging tool. For example, the engagement portion may include a groove into which a leveraging tool may be inserted to rotate the torque limit tool.

According to examples disclosed herein, the device removal tool may include at least one separation beam to push, upon application of the loosening torque to the device, the device removal tool toward the device to permit engagement of the plurality of catch members with the engagement face of the device.

The device removal tool may further include at least one device ejector that includes a tab that is movable to eject the device from the device removal tool. In one example, the tab may be depressed to eject the device from the device removal tool.

According to examples disclosed herein, the plurality of catch members may be generally oriented toward a first direction of the device removal tool. In this regard, the device removal tool may include a further plurality of catch members that may be generally oriented toward a second direction that is generally opposite to the first direction. The further plurality of catch members may be engageable with a further engagement face of a further device to attach, upon engagement of the further plurality of catch members with the further engagement face, the device removal tool to the further device. In this regard, the aforementioned device may include the skimmer cone or the sampler cone, and the further device may include the other of the skimmer cone or the sampler cone. The further plurality of catch members may engage the further engagement face with a further removal force that is sufficient to remove, upon engagement of the further plurality of catch members with the further engagement face, the further device from the instrument. For example, as disclosed herein, the further removal force may be greater than or equal to 20 G normal the central axis of the device removal tool for the device that may include the skimmer cone and/or the sampler cone of the ICP-MS instrument.

According to examples disclosed herein, the multi-device removal and installation tool may include the device removal tool that includes a first side having a first receiver with a first dimension that removably receives a first device. The device removal tool may include a second side having a second receiver with a second dimension that removably receives a second device. The first dimension may be different from the second dimension. The device removal tool may include at least one torque beam that deflects upon application of a tightening torque that exceeds a torque threshold to limit the tightening torque that is applied to a device. For this example of the multi-device removal and installation tool, the first device may include the skimmer cone and the second device may include the sampler cone of the instrument that includes the ICP-MS instrument. Alternatively, the first device may include the sampler cone and the second device may include the skimmer cone. For the example of the first device that may include the skimmer cone, the multi-device removal and installation tool may further include at least one separation beam to permit, upon application of a rotation torque to the first device, engagement of a plurality of catch members with an engagement face of the first device. For the example of the second device that may include the sampler cone, the multi-device removal and installation tool may further include at least one device ejector that includes a tab that is movable to eject the second device from the second receiver. According to examples disclosed herein, the first receiver and the second receiver may be dimensioned to respectively retain the first device and the second device at a specified height. For example, the specified height may permit the first device and the second device to be immersed in a liquid or another cleaning material disposed in a container and including a specified quantity for maintenance and/or cleaning purposes, without the need to utilize different containers for the first device and the second device.

According to examples disclosed herein, the device removal tool may be formed at least of Polyetherimide (PEI). However, those skilled in the art would appreciate in view of this disclosure that the device removal tool may be formed of other suitable materials that may be utilized to attach the device removal tool to a device, as well as to retain the device in the device removal tool during performance of cleaning and other maintenance operations on the device, without departing from the scope of the disclosure.

According to examples disclosed herein, the multi-device removal and installation tool disclosed herein may provide protection for delicate features of a device such as the skimmer cone and/or the sampler cone. For example, the multi-device removal and installation tool disclosed herein may provide protection for features such as the cone tip, cone orifice, threads, etc.

According to examples disclosed herein, the multi-device removal and installation tool disclosed herein may be configured to grasp and retain devices of various sizes and/or configurations. For example, the catch members as disclosed herein may be configured to engage with various surfaces of a device to attach the device removal tool to the device.

According to examples disclosed herein, the multi-device removal and installation tool disclosed herein may eliminate the need to transfer a device, such as the skimmer cone and/or the sampler cone, between fixtures that may be used for removal, cleaning, storage, and/or installation of the device. For example, the device removal tool and the torque limit tool may be utilized as needed for a device, such as the skimmer cone and/or the sampler cone, for removal, cleaning, storage, and/or installation of the device.

According to examples disclosed herein, the multi-device removal and installation tool disclosed herein may provide for application of a controlled torque onto a device, such as the skimmer cone, to ensure consistent leak tight mounting of the skimmer cone on an instrument, without damage to threads of the device from over-tightening.

According to examples disclosed herein, the multi-device removal and installation tool disclosed herein may provide for support of a device, such as the skimmer cone and/or the sampler cone, at a specified height (e.g., elevation). In this regard, once the device is retained in the device removal tool, the device may be uniformly immersed in a solution, such as an ultrasonic bath. For example, two or more devices may be each retained in corresponding device removal tools, and the device removal tools may be placed in a solution to uniformly immerse the devices.

According to examples disclosed herein, the multi-device removal and installation tool disclosed herein may retain a device, such as the skimmer cone and/or the sampler cone, in an inverted orientation. In this regard, when the device is placed in a solution, a specified portion, such as a tip, of the device may be placed in the solution. Thus, the device may be placed in one or more solutions, for example, in a first solution for immersion of a tip of the device, and in another solution for immersion of a bottom portion of the device.

According to examples disclosed herein, the multi-device removal and installation tool disclosed herein may provide a hands-free platform for inspection of a device, such as the skimmer cone and/or the sampler cone. In this regard, once the device is retained in the device removal tool, the device may be inspected without the need for a user to grasp the device with the user's hands.

The multi-device removal and installation tool is described in further detail with reference to FIGS. 1-12B.

Specifically, FIG. 1 illustrates an isometric view of a multi-device removal and installation tool 100 including a device removal tool 102 and a torque limit tool 104, in accordance with an example of the present disclosure. Further, FIG. 2 illustrates a perspective view of an instrument 200, including a first device 202 and a second device 204 that are removable by the multi-device removal and installation tool 100, and an enlarged exploded view of the first device 202, the second device 204, and related components, in accordance with an example of the present disclosure.

Figure 2:
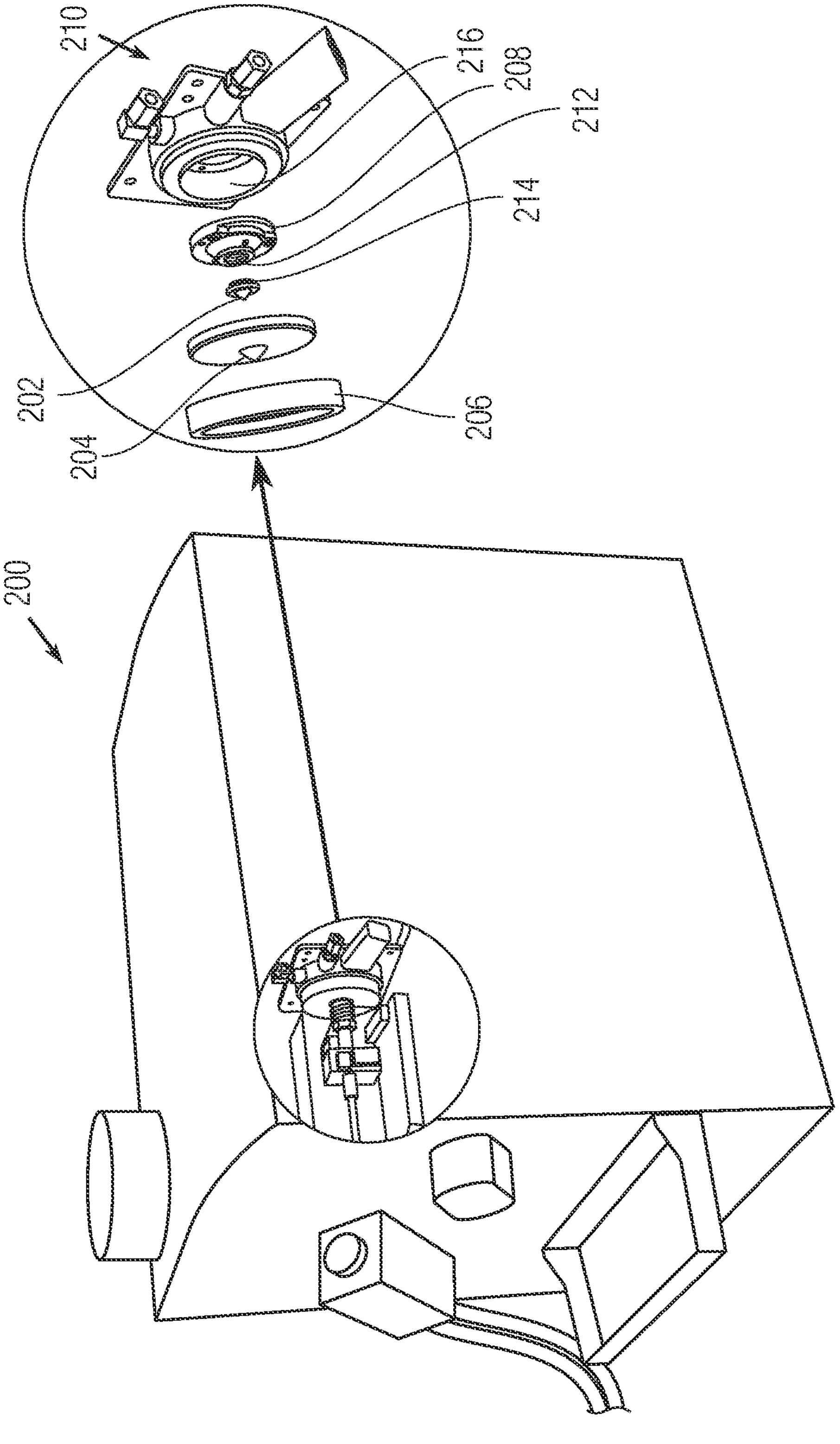
FIG. 2 illustrates a perspective view of an instrument, including a first device and a second device that are removable by the multi-device removal and installation tool of FIG. 1, and an enlarged exploded view of the first device, the second device, and related components, in accordance with an example of the present disclosure.

Referring to FIGS. 1 and 2, the multi-device removal and installation tool 100 may include the device removal tool 102 and the torque limit tool 104. The device removal tool 102 may be used, as disclosed herein, to remove, retain, and/or for re-installation of a device, such as a skimmer cone and/or a sampler cone of the instrument 200 that may include the ICP-MS instrument. For purposes of an explanation of operation of the device removal tool 102 and the torque limit tool 104, the first device 202 and the second device 204 may respectively correspond to the skimmer cone and the sampler cone of the instrument 200. However, those skilled in the art would appreciate in view of this disclosure that the first device 202 and the second device 204 may respectively correspond to the sampler cone and the skimmer cone of the instrument 200. Further, those skilled in the art would appreciate in view of this disclosure that the first device 202 and the second device 204 may be any of a variety of devices that may be grasped by the device removal tool 102 as disclosed herein. Additionally, the further components identified in FIG. 1 will be described in further detail with reference to FIGS. 2-12B.

Referring to FIG. 2, other components such as an outer retention ring 206, a device mount 208, and a manifold assembly 210 are illustrated. The device mount 208 may include internal threads 212 onto which a threaded portion 214 of the first device 202 may be threadedly engaged for retention of the first device 202 to the device mount 208. The second device 204 may be retained on the manifold assembly 210 by the outer retention ring 206.

Figure 3:
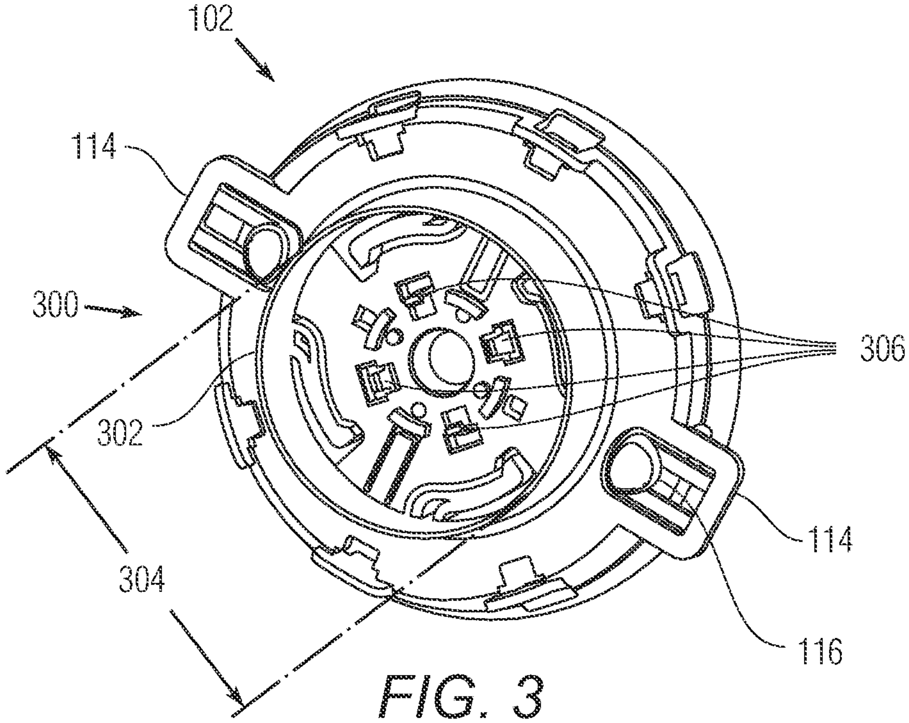
FIG. 3 illustrates an isometric view of the device removal tool of FIG. 1, illustrating a first side having a first receiver with a first dimension that removably receives the first device, in accordance with an example of the present disclosure.
Figure 4:
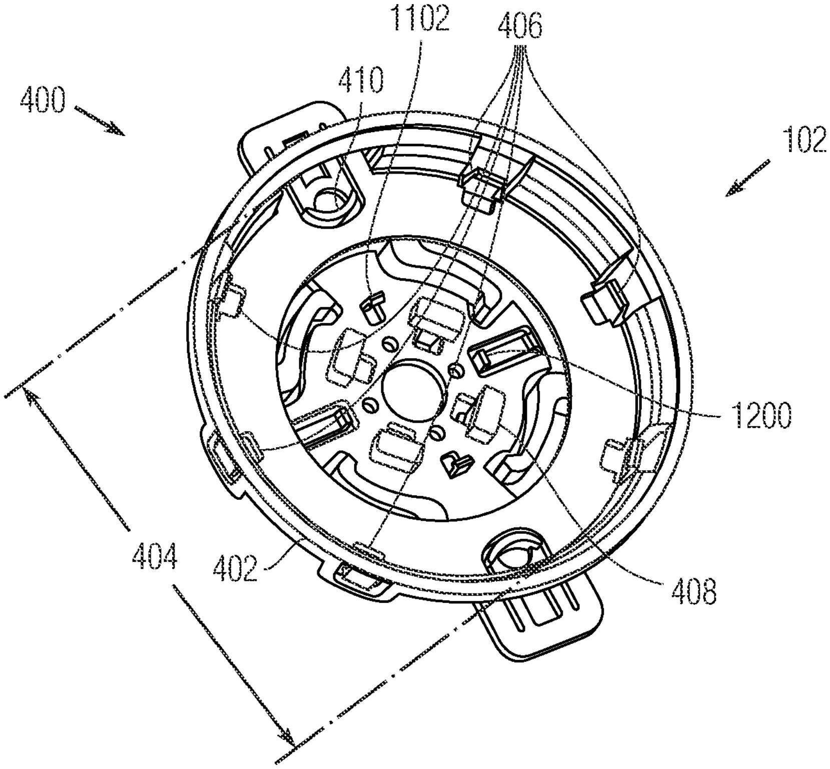
FIG. 4 illustrates an isometric view of the device removal tool of FIG. 1, illustrating a second side having a second receiver with a second dimension that removably receives the second device, in accordance with an example of the present disclosure.
Figure 6:
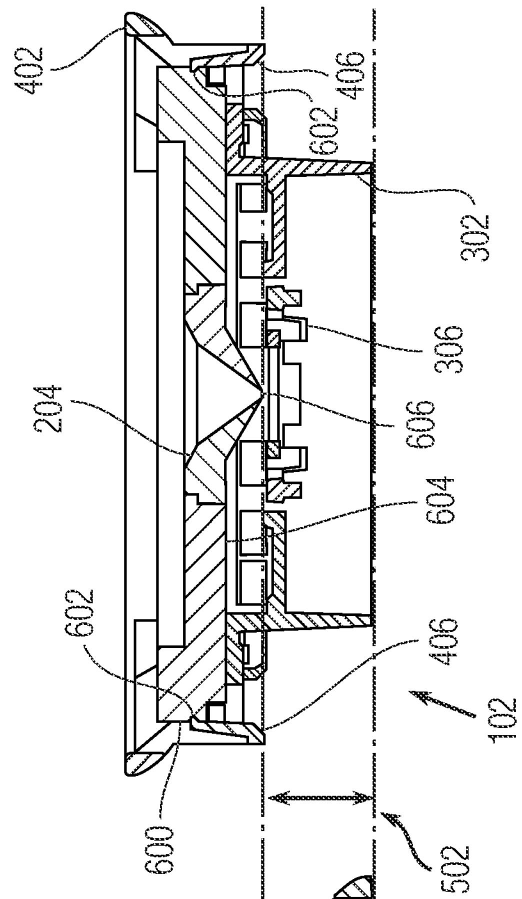
FIG. 6 illustrates a sectional view of the device removal tool of FIG. 1, taken generally along line 6-6 of FIG. 1 and including the second device removably received in the second receiver, in accordance with an example of the present disclosure.
Figure 5:
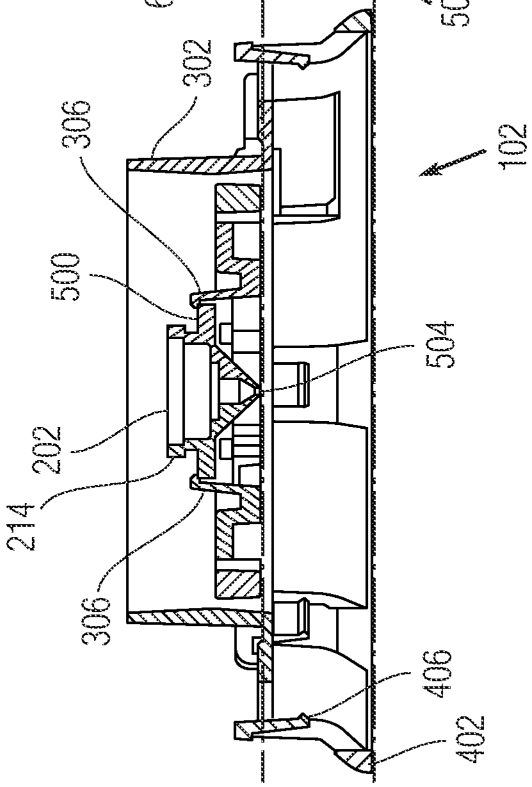
FIG. 5 illustrates a sectional view of the device removal tool of FIG. 1, taken generally along line 5-5 of FIG. 1 and including the first device removably received in the first receiver, in accordance with an example of the present disclosure.

FIG. 3 illustrates an isometric view of the device removal tool 102, illustrating a first side having a first receiver with a first dimension that removably receives the first device 202, in accordance with an example of the present disclosure. FIG. 4 illustrates an isometric view of the device removal tool 102, illustrating a second side having a second receiver with a second dimension that removably receives the second device 204, in accordance with an example of the present disclosure. FIG. 5 illustrates a sectional view of the device removal tool 102, taken generally along line 5-5 of FIG. 1 and including the first device 202 removably received in the first receiver, in accordance with an example of the present disclosure. Further, FIG. 6 illustrates a sectional view of the device removal tool 102, taken generally along line 6-6 of FIG. 1 and including the second device 204 removably received in the second receiver, in accordance with an example of the present disclosure.

Referring to FIGS. 1-4, and particularly to FIGS. 3 and 4, the device removal tool 102 may include a first side 300 having a first receiver 302 with a first dimension 304 that removably receives the first device 202. The device removal tool 102 may include a second side 400 having a second receiver 402 with a second dimension 404 that removably receives the second device 204. The first dimension 304 may be different from the second dimension 404.

Referring to FIGS. 1-6, and particularly to FIGS. 3-6, the device removal tool 102 may include a plurality of catch members (e.g., 306 or 406) engageable with an engagement face (e.g., 500 or 600) of a device (e.g., first device 202 or second device 204) to attach, upon engagement of the plurality of catch members (e.g., 306 or 406) with the engagement face (e.g., 500 or 600), the device removal tool 102 to the device (e.g., first device 202 or second device 204). The plurality of catch members (e.g., 306 or 406) may engage the engagement face (e.g., 500 or 600) with a removal force that is sufficient to remove, upon engagement of the plurality of catch members (e.g., 306 or 406) with the engagement face (e.g., 500 or 600), the device (e.g., first device 202 or second device 204) from the instrument 200. For example, with respect to the first device 202 and the second device 204, the removal force may be greater than or equal to 20 G normal to axis 118 of the device removal tool 102 that is needed to remove, upon engagement of the plurality of catch members (e.g., 306 or 406) with the engagement face (e.g., 500 or 600), the device (e.g., first device 202 or second device 204) from the instrument 200. This removal force may be specified to prevent inadvertent ejection of the first device 202 and/or the second device 204 from the device removal tool 102. Yet further, this removal force may also be sufficient to remove the first device 202 and/or the second device 204 from the instrument 200 even when binding corrosion is present in the areas of the first device 202 and/or the second device 204. Those skilled in the art would appreciate in view of this disclosure that the removal force may be increased or decreased based on various factors, such as, for example, material and/or dimensional properties of the first device 202 and/or the second device 204, material and/or dimensional properties of the device removal tool 102, properties of the instrument 200, etc. However, generally, the removal force may be from approximately 20 G to approximately 100 G, such as from approximately 50 G to approximately 100 G for the first device 202, and from approximately 20 G to approximately 25 G for the second device 204.

With respect to the catch members (e.g., 306 or 406), according to examples disclosed herein, the plurality of catch members (e.g., 306 or 406) may include three or more catch members. For example, as shown in FIG. 3 for a particular configuration of the device removal tool 102 disclosed herein, the plurality of catch members 306 may include four catch members engageable with the engagement face 500 of the device (e.g., first device 202) that includes the skimmer cone of the instrument 200. According to another example disclosed herein, the plurality of catch members 406 may include six catch members engageable with the engagement face 600 of a device (e.g., second device 204) that includes the sampler cone of the instrument 200. However, those skilled in the art would appreciate in view of this disclosure that the number of catch members (e.g., 306 or 406) may be increased or decreased as needed to attach the device removal tool 102 to the device (e.g., first device 202 or second device 204), without departing from the scope of the disclosure. Further, those skilled in the art would appreciate in view of this disclosure that the device (e.g., first device 202 or second device 204) may include any type of device that may be grasped and moved by the device removal tool 102.

Referring again to FIGS. 1-6, and particularly to FIGS. 3-6, according to examples disclosed herein, the plurality of catch members (e.g., 306 or 406) may be generally oriented toward a first direction (e.g., upwards direction in the orientation of FIG. 5) of the device removal tool 102. In this regard, the device removal tool 102 may include a further plurality of catch members (e.g., the other of 306 or 406) that are generally oriented toward a second direction (e.g., upwards direction in the orientation of FIG. 6; note, orientation of the device removal tool 102 is reversed in FIGS. 5 and 6) that is generally opposite to the first direction. The further plurality of catch members (e.g., the other of 306 or 406) may be engageable with a further engagement face (e.g., the other of 500 or 600) of a further device (e.g., the other of 202 or 204) to attach, upon engagement of the further plurality of catch members (e.g., the other of 306 or 406) with the further engagement face (e.g., the other of 500 or 600), the device removal tool 102 to the further device (e.g., the other of 202 or 204). In this regard, the aforementioned device (e.g., the other of 202 or 204) may include the skimmer cone or the sampler cone, and the further device may include the other of the skimmer cone or the sampler cone. The further plurality of catch members (e.g., the other of 306 or 406) may engage the further engagement face (e.g., the other of 500 or 600) with a further removal force that is sufficient to remove, upon engagement of the further plurality of catch members (e.g., the other of 306 or 406)

with the further engagement face (e.g., the other of 500 or 600), the further device (e.g., the other of 202 or 204) from the instrument 200.

Referring to FIGS. 3 and 6, with respect to the engagement face 600, according to examples disclosed herein, the engagement face 600 may include a channel 602 that engages with the plurality of catch members 406. For example, the engagement face 600 may include a V-shaped, or a U-shaped channel. However, those skilled in the art would appreciate in view of this disclosure that the shape of the channel 602 may be formed in any configuration to engage in a catch member, without departing from the scope of the disclosure.

Figure 7:
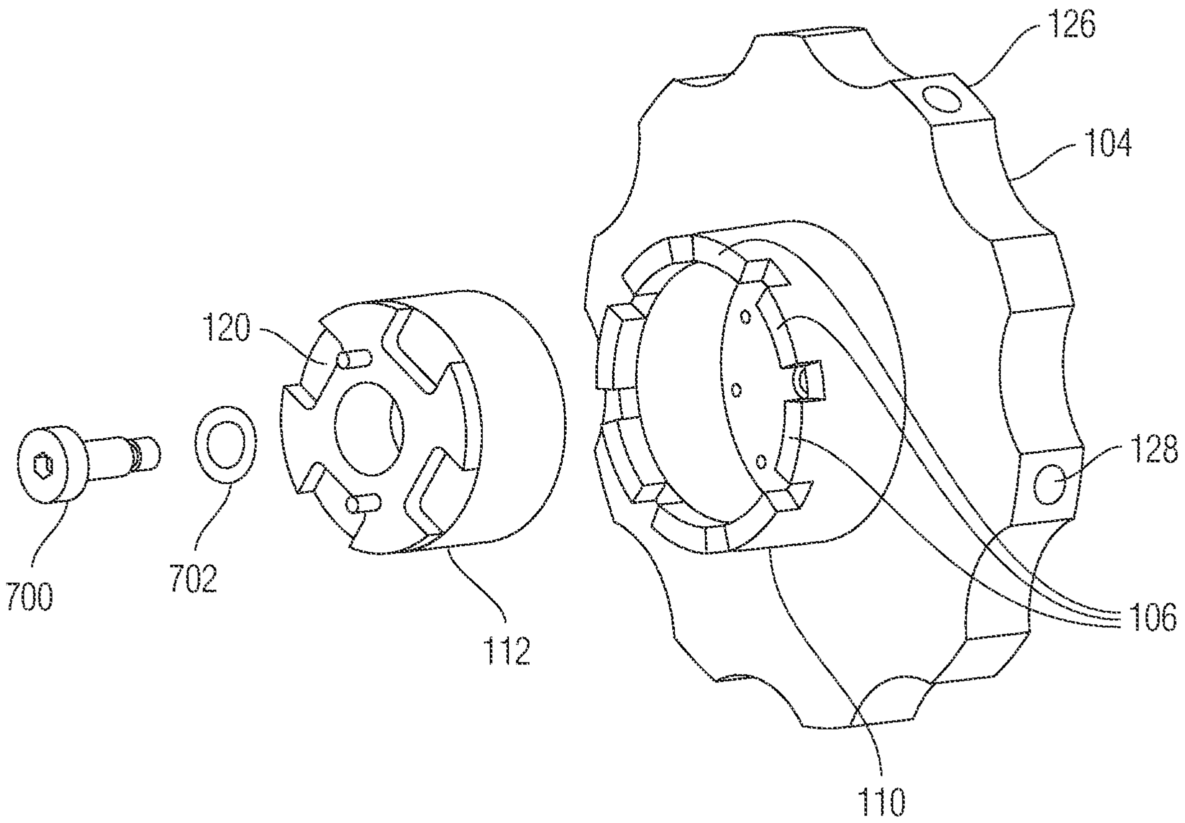
FIG. 7 illustrates an exploded isometric view of the torque limit tool of FIG. 1, in accordance with an example of the present disclosure.
Figure 8:
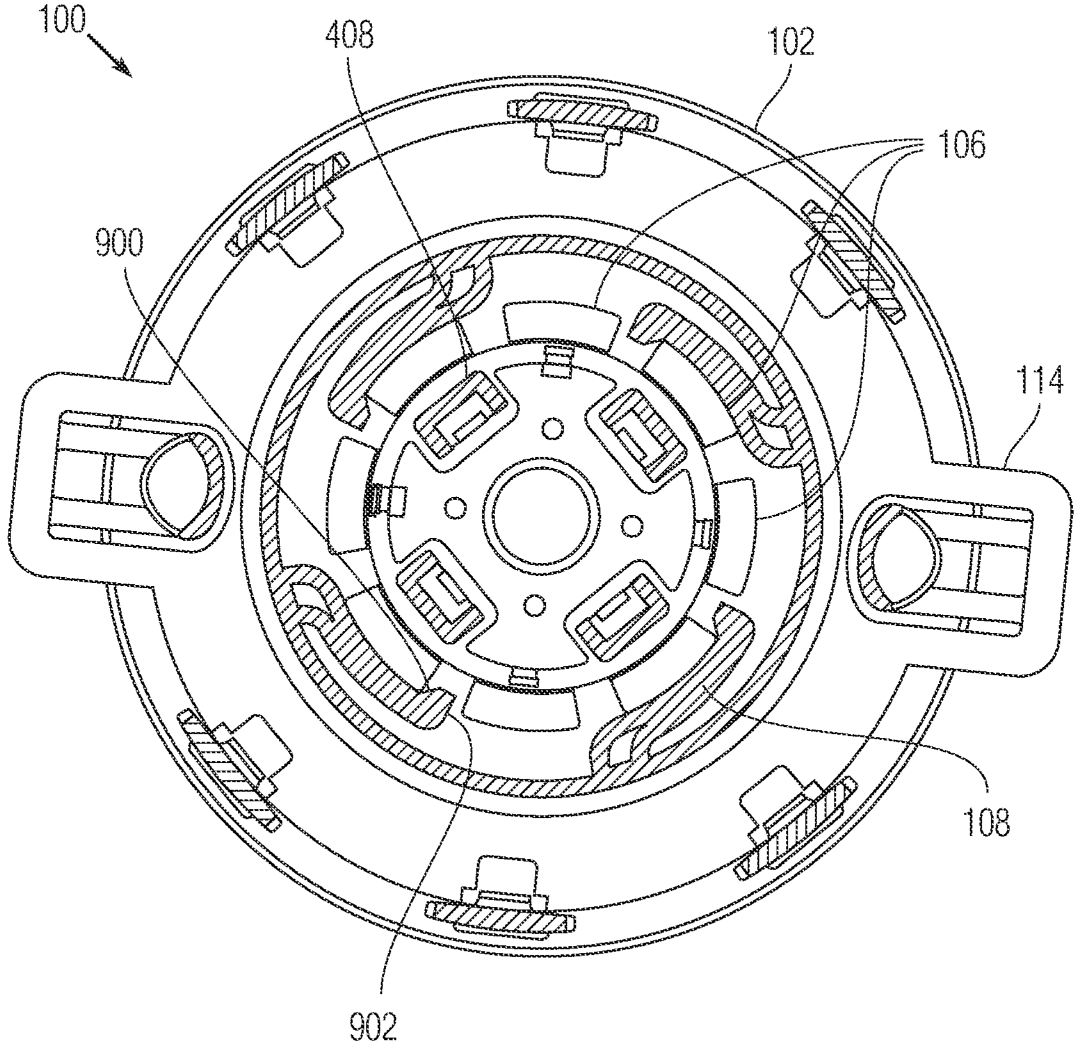
FIG. 8 illustrates a diagrammatic sectional view of the device removal tool and the torque limit tool of FIG. 1 in an installed configuration, with a portion of the first receiver removed to illustrate operation of a plurality of torque beams of the device removal tool and a plurality of protrusions of the torque limit tool, in accordance with an example of the present disclosure.
Figure 9:
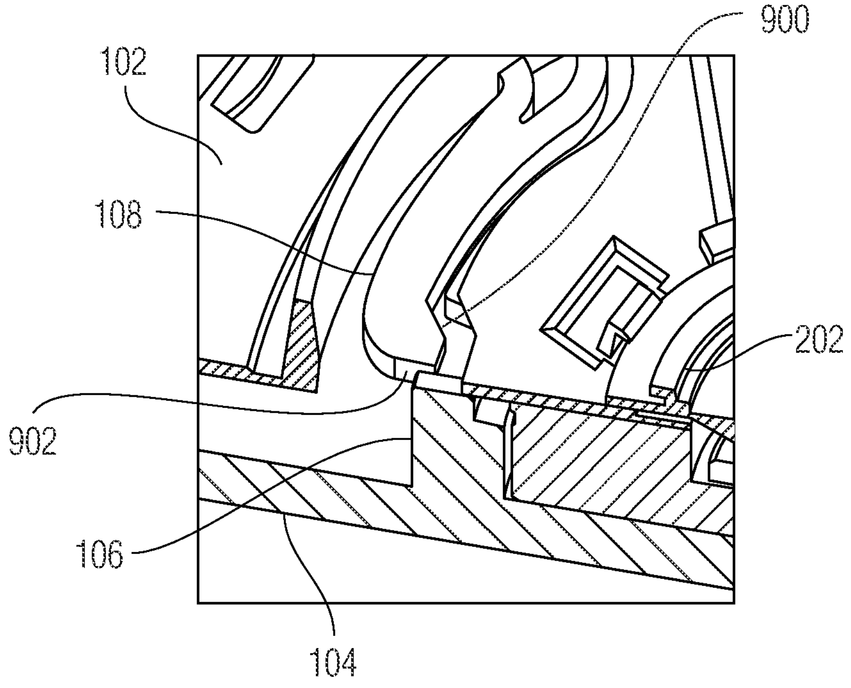
FIG. 9 illustrates a diagrammatic sectional view of the device removal tool and the torque limit tool of FIG. 1 in an installed configuration, illustrating operation of a torque beam of the device removal tool and a protrusion of the torque limit tool, in accordance with an example of the present disclosure.

FIG. 7 illustrates an exploded isometric view of the torque limit tool 104 of FIG. 1, in accordance with an example of the present disclosure. FIG. 8 illustrates a diagrammatic sectional view of the device removal tool 102 and the torque limit tool 104 of FIG. 1 in an installed configuration, with a portion of the first receiver 302 removed to illustrate operation of a plurality of torque beams of the device removal tool 102 and a plurality of protrusions of the torque limit tool 104, in accordance with an example of the present disclosure. FIG. 9 illustrates a diagrammatic sectional view of the device removal tool 102 and the torque limit tool 104 of FIG. 1 in an installed configuration, illustrating operation of a torque beam 108 of the device removal tool 102 and a protrusion 106 of the torque limit tool 104, in accordance with an example of the present disclosure.

Referring to FIGS. 1, 2, and 7-9, and particularly to FIGS. 8 and 9, the torque limit tool 104 may include at least one protrusion 106, and may be removably engageable with the device removal tool 102. The torque limit tool 104 may apply, by the at least one protrusion 106, in a first rotation direction (e.g., counter-clockwise direction in the orientations of FIGS. 8 and 9) of the torque limit tool 104 and the device removal tool 102, a tightening torque to the first device 202. Further, the torque limit tool 104 may apply, by the at least one protrusion 106, in a second rotation direction (e.g., clockwise direction in the orientations of FIGS. 8 and 9) of the torque limit tool 104 and the device removal tool 102, a loosening torque to the first device 202.

Still referring to FIGS. 1, 2, and 7-9, and particularly to FIGS. 8 and 9, the at least one protrusion 106 may be engageable with at least one torque beam 108 of the device removal tool 102 to deflect (e.g., outwards in the orientation of FIG. 8), upon application of the tightening torque that exceeds a torque threshold, the at least one torque beam 108 to limit the tightening torque that is applied to the first device 202. For example, as shown in FIGS. 8 and 9, angled face 900 of the at least one torque beam 108 may engage with the at least one protrusion 106 to deflect, upon application of the tightening torque that exceeds a torque threshold, the at least one torque beam 108 to limit the tightening torque that is applied to the first device 202. In this manner, the torque beam may prevent overtightening of the first device 202 when the first device 202 is rotatably attached back onto the instrument 200. Further, as shown in FIGS. 8 and 9, complementary mating face 902 of the at least one torque beam 108 may engage with the at least one protrusion 106 to provide unlimited torque to loosen the first device 202.

Figure 10:
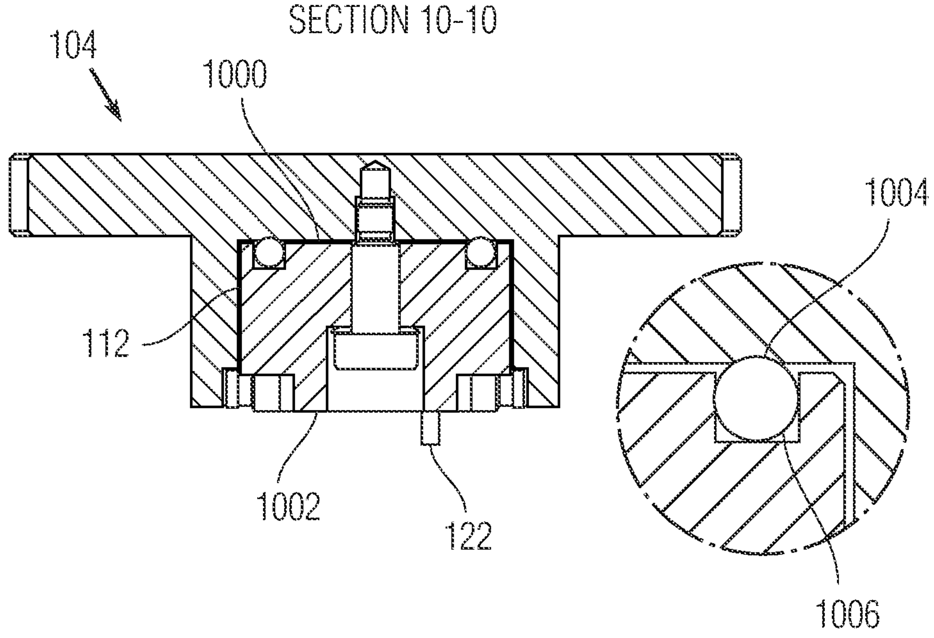
FIG. 10 illustrates a sectional view of the torque limit tool, taken generally along line 10-10 of FIG. 1, and including an enlarged view of a ball and a detent for controlling an orientation of a drive member, in accordance with an example of the present disclosure.

FIG. 10 illustrates a sectional view of the torque limit tool 104, taken generally along line 10-10 of FIG. 1, and including an enlarged view of a ball and a detent for controlling an orientation of a drive member 112, in accordance with an example of the present disclosure.

Referring to FIGS. 1, 5, 7, and 10, the at least one protrusion 106 of the torque limit tool 104 may be provided on a retainer 110. The retainer 110 may be removably engageable with the device removal tool 102 that engages the engagement face 500 of the first device 202. The torque limit tool 104 may include a drive member 112 having an inside surface 1000 and an outside surface 1002. As shown in FIGS. 1 and 7, the drive member 112 may be rotatably attached by a connector 700, including an intermediate washer 702, that permits rotation of the drive member 112 relative to a knob 126. Further, as shown in FIG. 10, the torque limit tool 104 may include the at least one detent 1004 positioned on the inside surface 1000 into which a corresponding ball 1006 is pressed by the drive member 112. For example, the torque limit tool 104 may include six detents into which corresponding balls are pressed by the drive member 112. The engagement of the detents and balls may provide alignment of the at least one protrusion 106 to at least one pocket 120 for coupling of the device removal tool 102 and the torque limit tool 104. The at least one pocket 120 (e.g., four pockets shown in FIG. 1) may engage with at least one corresponding boss 408 (e.g., four bosses shown in FIG. 4) of the device removal tool 102 to align the device removal tool 102 relative to the torque limit tool 104.

Referring to FIGS. 1 and 7, the torque limit tool 104 may include at least one engagement portion 128 to engage a leveraging tool (not shown). For example, the engagement portion 128 may include a groove into which the leveraging tool may be inserted to rotate the torque limit tool 104.

Figure 11:
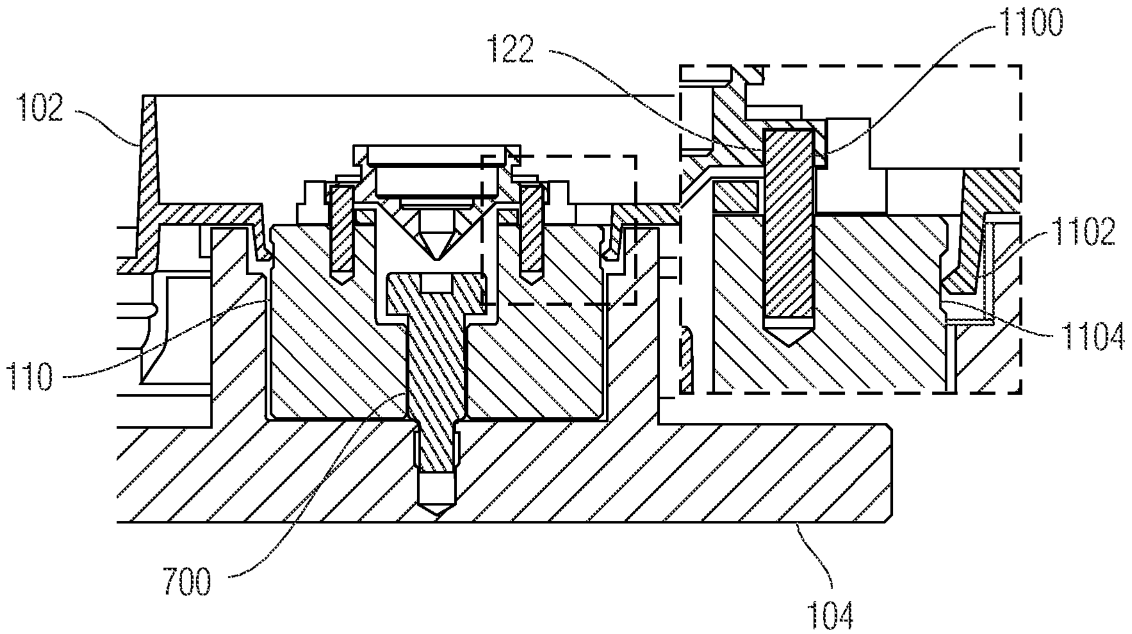
FIG. 11 illustrates a diagrammatic sectional view of the device removal tool and the torque limit tool of FIG. 1 in an installed configuration, illustrating operation of torque limit tool pins to rotate the first device, and clips to attach the torque limit tool to the device removal tool, in accordance with an example of the present disclosure.

FIG. 11 illustrates a diagrammatic sectional view of the device removal tool 102 and the torque limit tool 104 of FIG. 1 in an installed configuration, illustrating operation of torque limit tool pins to rotate the first device 202, and clips to attach the torque limit tool 104 to the device removal tool 102, in accordance with an example of the present disclosure.

Referring to FIGS. 1 and 11, once the device removal tool 102 is coupled to the torque limit tool 104, the assembled multi-device removal and installation tool 100 may be positioned over the first device 202, which may include the skimmer cone, and rotated until torque limit tool pin 122 (e.g., two torque limit tool pins shown), protrudes through hole 124 to engage a complementary hole 1100 of the first device 202. In this regard, at least one clip 1102 (e.g., two clips shown in FIG. 11) of the device removal tool 102 may resiliently engage with a channel 1104 of the retainer 110 to couple the device removal tool 102 to the torque limit tool 104.

Figure 12A:
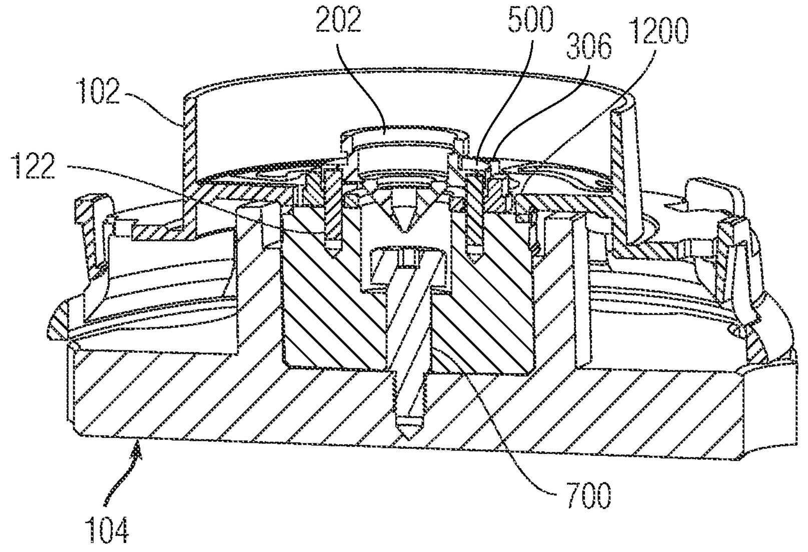
FIGS. 12A and 12B illustrate diagrammatic sectional views of the device removal tool and the torque limit tool of FIG. 1 in an installed configuration, illustrating operation of a separation beam of the device removal tool, in accordance with an example of the present disclosure.
Figure 12B:
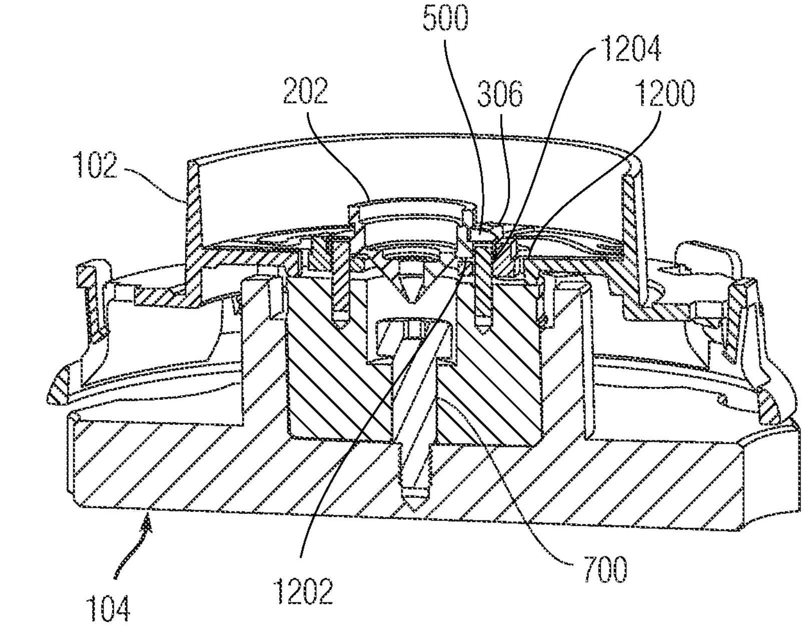

FIGS. 12A and 12B illustrate diagrammatic sectional views of the device removal tool 102 and the torque limit tool 104 in an installed configuration, illustrating operation of a separation beam 1200 of the device removal tool 102, in accordance with an example of the present disclosure.

Referring to FIGS. 1, 2, 8, 9, 12A, and 12B, the device removal tool 102 may include at least one separation beam 1200 to push, upon application of the loosening torque (e.g., clockwise direction in the orientations of FIGS. 8 and 9) to the first device 202, the device removal tool 102 toward the first device 202 to permit engagement of the plurality of catch members 306 with the engagement face 500 of the first device 202. In this regard, when the first device 202 is installed on the instrument 200, the engagement face 500 of the first device 202 may be in contact with a plane face of the manifold assembly 210. This contact may limit the position of the device removal tool 102 such that the catch members 306 become coplanar with the plane face of the manifold assembly 210 to prevent engagement of the plurality of catch members 306 with the engagement face 500 of the first device 202. Once the torque limit tool 104 is pressed in towards the first device 202, the at least one separation beam 1200 may deflect upwards in the orientation of FIG. 12A. Referring next to FIG. 12B, as the first device 202 is unscrewed, the first device 202 may push the torque limit tool 104 away from the manifold assembly 210, while the at least one separation beam 1200 may push the device removal tool 102 toward the manifold assembly 210. As the first device 202 continues to be unscrewed, a front face 1202 of the first device may rest upon a target face 1204 of the device removal tool, and the plurality of catch members 306 may engage the engagement face 500 to retain the first device 202.

Referring to FIGS. 1, 3, 4, and 6, the device removal tool 102 may further include at least one device ejector 114 that includes a tab 116 that is movable to eject the second device 204 from the device removal tool 102. In one example, the tab 116 may be depressed to eject the second device 204 from the device removal tool 102. For example, when the tab 116 is depressed, ejection face 410 may contact inner plane 604 of the second device 204 to eject the second device 204 from the device removal tool 102. Alternatively, if the ejection face 410 is contiguously engaged with the inner plane 604 of the second device 204, when the tab 116 is depressed, the ejection face 410 may be used to push the second device 204 sufficiently to overcome the removal force of the catch members 406 with the engagement face 600, and to thus eject the second device 204 from the device removal tool 102.

Referring to FIGS. 1 and 3-6, according to examples disclosed herein, the first receiver 302 and the second receiver 402 may be dimensioned to retain the first device 202 and the second device 204 at a specified height 502. For example, the specified height 502 may permit the first device 202 and the second device 204 to be immersed in a liquid or another cleaning material disposed in a container and including a specified quantity for maintenance and/or cleaning purposes, without the need to utilize different containers for the first device 202 and the second device 204.

Referring again to FIG. 1, according to examples disclosed herein, the device removal tool 102 may be formed at least of Polyetherimide (PEI). However, those skilled in the art would appreciate in view of this disclosure that the device removal tool 102 may be formed of other suitable materials that may be utilized to attach the device removal tool 102 to a device (e.g., 202 or 204), as well as to retain the device (e.g., 202 or 204) in the device removal tool 102 during performance of cleaning and other maintenance operations on the device (e.g., 202 or 204), without departing from the scope of the disclosure.

Operation of the multi-device removal and installation tool 100 is described in further detail with reference to FIGS. 1-12B.

Specifically, referring to FIGS. 1, 2, 4, and 6, with respect to utilization of the device removal tool 102 for the second device 204 that may include the sampler cone, once the second device 204 is exposed on the instrument 200, the second receiver 402 of the device removal tool 102 may be placed over and pressed onto the second device 204 until the device removal tool 102 contiguously engages inner plane 604 of the second device 204. Once the device removal tool 102 contiguously engages the inner plane 604, the catch members 406 may engage the engagement face 600 of the second device 204. The device removal tool 102 may then be withdrawn (e.g., by pulling away) from the instrument 200 with the second device 204 securely retained therein.

Once the second device 204, which is still disposed in the device removal tool 102, is removed from the instrument 200, the second device 204 may be accessed as needed for maintenance, and other purposes. For example, for the second device 204 that includes the sampler cone, features such as a cone tip, a cone orifice, cone threads, etc., may be inspected, and mechanical cleaning of the second device 204 may be performed as needed. For example, for the second device 204 that includes the sampler cone, the second device 204 may be placed into an ultrasonic cleaner with cone tip 606 facing downwards (e.g., in the orientation of FIG. 6). Various types of cleaning solutions or solvents may be utilized for cleaning of the cone tip 606. In this regard, as disclosed herein, other devices (e.g., the first device 202) may also be placed into the ultrasonic cleaner with cone tip 504 facing downwards (e.g., in the orientation of FIG. 5). Yet further, as disclosed herein, the first device 202 and the second device 204 may be retained at the specified height 502 based on the dimensions of the first receiver 302 and the second receiver 402. For example, the specified height 502 may be specified such that a specified amount of the cone tips (e.g., 504 and 606) for the first device 202 and the second device 204 are immersed in the cleaning solutions or solvents.

After completion of the maintenance and/or cleaning activities on the second device 204, the second device 204, which is still disposed in the device removal tool 102, may be stored for later use or otherwise returned to the instrument 200. If the second device 204 is to be returned to the instrument 200, the device removal tool 102, with the second device 204 retained therein, may be brought towards the instrument 200. The second device 204 may be placed back into the manifold assembly 210. The tab 116 of each device ejector 114 may be pinched to eject the second device 204 from the device removal tool 102, and the device removal tool 102 may be withdrawn (e.g., pulled away) from the instrument 200 with the second device 204 remaining in the manifold assembly 210.

With continued reference to FIGS. 1, 2, and 10, with respect to utilization of the device removal tool 102 for the first device 202 that may include the skimmer cone, the torque limit tool 104 may be coupled to the device removal tool 102 in the orientation of FIG. 1. In this regard, as disclosed herein with reference to FIG. 10, the torque limit tool 104 may include the at least one detent 1004 positioned on the inside surface 1000 into which the corresponding ball 1006 is pressed by the drive member 112. For example, the torque limit tool 104 may include six detents into which corresponding balls are pressed by the drive member 112. As disclosed herein, the engagement of the detents and balls may provide alignment of the at least one protrusion 106 to the at least one pocket 120 for coupling of the device removal tool 102 and the torque limit tool 104.

Referring to FIGS. 1, 2, 8, and 11, once the device removal tool 102 is coupled to the torque limit tool 104, the assembled multi-device removal and installation tool 100 may be positioned over the first device 202, which may include the skimmer cone, and rotated until torque limit tool pin 122 (e.g., two torque limit tool pins shown) protrudes through hole 124 to engage the complementary hole 1100 of the first device 202. The first device 202 may now be unscrewed from the manifold assembly 210 by turning knob 126 of the torque limit tool 104 in a counter-clockwise direction (e.g., clockwise in the orientation of FIG. 8).

Referring to FIGS. 1, 12A, and 12B, as the first device 202 is unscrewed, the at least one separation beam 1200 may push, upon application of the loosening torque (e.g., clockwise direction in the orientations of FIGS. 8 and 9) to the first device 202, the device removal tool 102 toward the first device 202 to permit engagement of the plurality of catch members 306 with the engagement face 500 of the first device 202.

With continued reference to FIGS. 1, 12A, and 12B, the torque limit tool 104 may be decoupled (e.g., by pulling apart) from the device removal tool 102, and the first device 202 may be removed from the instrument 200, securely retained in the device removal tool 102.

In a similar manner as discussed above for the second device 204, with reference to FIGS. 1-3 and 5, once the first device 202, which is still disposed in the device removal tool 102, is removed from the instrument 200, the first device 202 may be accessed as needed for maintenance, and other purposes. For example, for the first device 202 that includes the skimmer cone, features such as a cone tip, a cone orifice, cone threads, etc., may be inspected, and mechanical cleaning of the first device 202 may be performed as needed. For example, for the first device 202 that includes the skimmer cone, the first device 202 may be placed into an ultrasonic cleaner with the cone tip 504 facing downwards (e.g., in the orientation of FIG. 5). Various types of cleaning solutions or solvents may be utilized for cleaning of the cone tip 504. In this regard, as disclosed herein, other devices (e.g., the second device 204) may also be placed into the ultrasonic cleaner with the cone tip 606 facing downwards (e.g., in the orientation of FIG. 6). Yet further, as disclosed herein, the first device 202 and the second device 204 may be retained at the specified height 502 based on the dimensions of the first receiver 302 and the second receiver 402. For example, the specified height 502 may be specified such that a specified amount of the cone tips (e.g., 504 and 606) for the first device 202 and the second device 204 are immersed in the cleaning solutions or solvents.

Referring to FIGS. 1, 2, and 8, after completion of the maintenance and/or cleaning activities on the first device 202, the first device 202, which is still disposed in the device removal tool 102, may be stored for later use or otherwise returned to the instrument 200. If the first device 202 is to be returned to the instrument 200, the device removal tool 102, with the first device 202 retained therein, may be brought towards the instrument 200. The first device 202 may be partially threaded onto the manifold assembly 210. The torque limit tool 104 may be coupled with the device removal tool 102 by engaging the torque limit tool pin 122 (e.g., two torque limit tool pins shown) through hole 124 to engage the complementary hole 1100 of the first device 202. The first device 202 may now be screwed into the manifold assembly 210 by turning knob 126 of the torque limit tool 104 in a clockwise direction (e.g., counter-clockwise in the orientation of FIG. 8). As the torque that is applied to tighten the first device 202 increases, the at least one torque beam 108 of the device removal tool 102 may deflect (e.g., outwards in the orientation of FIG. 8), upon application of the tightening torque that exceeds a torque threshold, the at least one torque beam 108 to limit the tightening torque that is applied to the first device 202. Generally, the torque beam 108 may deflect when torque that is applied to tighten the first device 202 reaches approximately 4 Nm or more, such as from approximately 4 Nm to approximately 5 Nm. In this manner, the torque beam may prevent overtightening of the first device 202 when the first device 202 is rotatably attached back onto the instrument 200. Once the at least one torque beam 108 deflects outwards, the knob 126 may spin freely, and the assembly including the device removal tool 102 and the torque limit tool 104 may be pulled away from the installed first device 202.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A sampler cone or a skimmer cone removal and installation tool comprising:

a device removal tool including a plurality of catch members engageable with an engagement face of a device to attach, upon engagement of the plurality of catch members with the engagement face, the device removal tool to the device, wherein the device includes the sampler cone or the skimmer cone, wherein the plurality of catch members engages the engagement face with a removal force that is sufficient to remove, upon engagement of the plurality of catch members with the engagement face, the device from an instrument that includes an inductively coupled plasma mass spectrometry (ICP-MS) instrument, wherein the plurality of catch members includes at least three inverted L-shaped catch members that are spaced and disposed at circumferentially fixed positions from adjacently disposed catch members, wherein the plurality of catch members is generally oriented toward a first direction of the device removal tool, wherein the device removal tool includes a further plurality of inverted L-shaped catch members that is generally oriented toward a second direction that is generally opposite to the first direction, wherein the further plurality of catch members is engageable with a further engagement face of a further device to attach, upon engagement of the further plurality of catch members with the further engagement face, the device removal tool to the further device, wherein the further device includes the other of the sampler cone or the skimmer cone, and wherein the further plurality of catch members engages the further engagement face with a further removal force that is sufficient to remove, upon engagement of the further plurality of catch members with the further engagement face, the further device from the instrument.

2. The sampler cone or the skimmer cone removal and installation tool according to claim 1, wherein the engagement face includes a channel that engages with the plurality of catch members.

3. The sampler cone or the skimmer cone removal and installation tool according to claim 1, wherein the device removal tool is formed at least of Polyetherimide.

4. The sampler cone or the skimmer cone removal and installation tool according to claim 1, wherein the device removal tool further comprises at least one torque beam that is spaced from and oriented laterally relative to a central axis of the device removal tool.

5. The sampler cone or the skimmer cone removal and installation tool according to claim 1, further comprising:

a torque limit tool including at least one protrusion and removably engageable with the device removal tool, wherein the torque limit tool is to apply, by the at least one protrusion, in a first rotation direction of the torque limit tool and the device removal tool, a tightening torque to the device, and apply, by the at least one protrusion, in a second rotation direction of the torque limit tool and the device removal tool, a loosening torque to the device, wherein the second rotation direction is generally opposite to the first rotation direction.

6. The sampler cone or the skimmer cone removal and installation tool according to claim 5, wherein the at least one protrusion is engageable with at least one torque beam of the device removal tool to deflect, upon application of the tightening torque that exceeds a torque threshold, the at least one torque beam to limit the tightening torque that is applied to the device.

7. The sampler cone or the skimmer cone removal and installation tool according to claim 5, wherein the device removal tool includes at least one separation beam to push, upon application of the loosening torque to the device, the device removal tool toward the device to permit engagement of the plurality of catch members with the engagement face of the device.

8. The sampler cone or the skimmer cone removal and installation tool according to claim 1, wherein the device removal tool includes at least one device ejector that includes a tab that is movable to eject the device from the device removal tool.

9. A multi-device removal and installation tool comprising:

a device removal tool including a plurality of catch members engageable with an engagement face of a device to attach, upon engagement of the plurality of catch members with the engagement face, the device removal tool to the device, wherein the plurality of catch members engages the engagement face with a removal force that is sufficient to remove, upon engagement of the plurality of catch members with the engagement face, the device from an instrument, wherein the device includes a sampler cone or a skimmer cone of the instrument that includes an inductively coupled plasma mass spectrometry (ICP-MS) instrument, wherein the plurality of catch members includes at least three inverted L-shaped catch members that are spaced and disposed at circumferentially fixed positions from adjacently disposed catch members, wherein the engagement face includes a channel that engages with the plurality of catch members, wherein the plurality of catch members is generally oriented toward a first direction of the device removal tool, wherein the device removal tool includes a further plurality of inverted L-shaped catch members that is generally oriented toward a second direction that is generally opposite to the first direction, wherein the further plurality of catch members is engageable with a further engagement face of a further device to attach, upon engagement of the further plurality of catch members with the further engagement face, the device removal tool to the further device, wherein the further device includes the other of the sampler cone or the skimmer cone, and wherein the further plurality of catch members engages the further engagement face with a further removal force that is sufficient to remove, upon engagement of the further plurality of catch members with the further engagement face, the further device from the instrument.

10. The multi-device removal and installation tool according to claim 9, wherein the device removal tool is formed at least of Polyetherimide.

11. The multi-device removal and installation tool according to claim 9, wherein the device removal tool further comprises at least one torque beam.

12. The multi-device removal and installation tool according to claim 9, further comprising:

a torque limit tool including at least one protrusion and removably engageable with the device removal tool, wherein the torque limit tool is to apply, by the at least one protrusion, in a first rotation direction of the torque limit tool and the device removal tool, a tightening torque to the device, and apply, by the at least one protrusion, in a second rotation direction of the torque limit tool and the device removal tool, a loosening torque to the device, wherein the second rotation direction is generally opposite to the first rotation direction.

13. The multi-device removal and installation tool according to claim 12, wherein the at least one protrusion is engageable with at least one torque beam of the device removal tool to deflect, upon application of the tightening torque that exceeds a torque threshold, the at least one torque beam to limit the tightening torque that is applied to the device.

14. The multi-device removal and installation tool according to claim 12, wherein the device removal tool includes at least one separation beam to push, upon application of the loosening torque to the device, the device removal tool toward the device to permit engagement of the plurality of catch members with the engagement face of the device.

15. The multi-device removal and installation tool according to claim 9, wherein the device removal tool includes at least one device ejector that includes a tab that is movable to eject the device from the device removal tool.

* * * * *